US 8,406,181 B2

(12) United States Patent
Hanaoka et al.

(10) Patent No.: US 8,406,181 B2
(45) Date of Patent: Mar. 26, 2013

(54) COMMUNICATION SYSTEM USING MULTI-RADIO MODE, MONITOR NODE APPARATUS, CONTROL NODE APPARATUS AND BASE STATION APPARATUS

(75) Inventors: Seishi Hanaoka, Tokyo (JP); Masashi Yano, Kawasaki (JP); Norihisa Matsumoto, Fuchu (JP); Naruhito Nakahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 528 days.

(21) Appl. No.: 12/376,832

(22) PCT Filed: Aug. 9, 2006

(86) PCT No.: PCT/JP2006/316063
§ 371 (c)(1),
(2), (4) Date: Feb. 9, 2009

(87) PCT Pub. No.: WO2008/018151
PCT Pub. Date: Feb. 14, 2008

(65) Prior Publication Data
US 2010/0177714 A1 Jul. 15, 2010

(51) Int. Cl.
*H04W 4/00* (2009.01)
*H04L 12/66* (2006.01)
*H04L 12/28* (2006.01)
*H04J 3/16* (2006.01)

(52) U.S. Cl. ........ 370/329; 370/331; 370/338; 370/352; 370/401; 370/437

(58) Field of Classification Search .................. 370/329, 370/331–332, 338, 437
See application file for complete search history.

(56) References Cited

U.S. PATENT DOCUMENTS 7,447,183 B1* 11/2008 Leung ........................ 370/338
2004/0107234 A1* 6/2004 Rajahalme ................... 709/200
(Continued)

FOREIGN PATENT DOCUMENTS

EP  1 395 077 A1  3/2004
EP  1 460 815      9/2004

OTHER PUBLICATIONS

Herwono et al., "Integration of Media Point System in UMTS to Provide Session Handover for Sip-Based Multimedia Services", IEEE 16th International Symposium on Personal, Indoor and Mobile Radio Communications, vol. 3, Sep. 14, 2005, pp. 1758-1763.
Proceedings of the 2005 IEICE Communications Society Conference, Sep. 20-23, 2005.

(Continued)

*Primary Examiner* — Brandon Renner
(74) *Attorney, Agent, or Firm* — Antonelli, Terry, Stout & Kraus, LLP.

(57) ABSTRACT

A communication system which includes plural radio systems, and which connects to a terminal apparatus corresponding to the plural radio systems, comprising: access points for the each radio system; gateways; an authentication apparatus; and a home agent. The authentication apparatus being shared by the plural radio systems: assigns an IP address to the terminal apparatus in a radio system which is initially connected among the plural radio systems according to an IP address assignment request from the terminal; judges whether an IP address assignment request for a radio system to be subsequently connected is from the same terminal apparatus by using an unique identifier of the terminal; and assigns the IP address assigned in the initially connected radio system to the terminal apparatus in the radio system to be subsequently connected in a case where the assignment request is determined to be from the same terminal apparatus.

6 Claims, 14 Drawing Sheets

U.S. PATENT DOCUMENTS

| | | | |
|---|---|---|---|
| 2004/0166843 A1* | 8/2004 | Hahn | 455/426.2 |
| 2004/0179539 A1 | 9/2004 | Takeda et al. | |
| 2004/0208187 A1* | 10/2004 | Mizell et al. | 370/401 |
| 2005/0078824 A1 | 4/2005 | Malinen et al. | |
| 2005/0083912 A1* | 4/2005 | Afshar et al. | 370/352 |
| 2005/0166043 A1 | 7/2005 | Zhang et al. | |
| 2006/0015590 A1* | 1/2006 | Patil et al. | 709/220 |
| 2006/0140150 A1 | 6/2006 | Olvera-Hernandez et al. | |
| 2006/0291455 A1* | 12/2006 | Katz et al. | 370/355 |
| 2007/0014270 A1* | 1/2007 | Unruh | 370/338 |
| 2007/0060169 A1* | 3/2007 | Johansson et al. | 455/453 |

OTHER PUBLICATIONS

Mitora, et al., "Cognitive Radio: Making Software Radios More Personal", 1999 IEEE Personal Communication, vol. 6, No. 4 (Aug. 1999).

Mitora, "Cognitive radio for flexible mobile multimedia communications", 1999 IEEE Int Workshop on Mobile Multimedia Communications Digest (Nov. 1999).

Extended European Search Report for European patent application No. 06782742.8-2412 / 2051452 PCT/JP2006316063, used on May 22, 2012.

\* cited by examiner

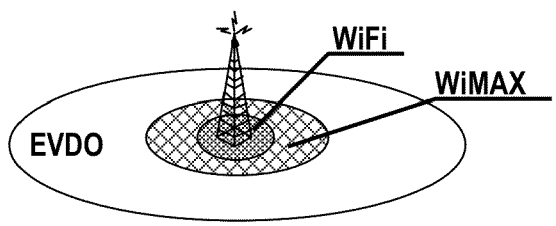
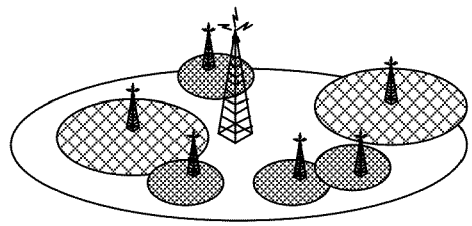
FIG. 14A  FIG. 14B
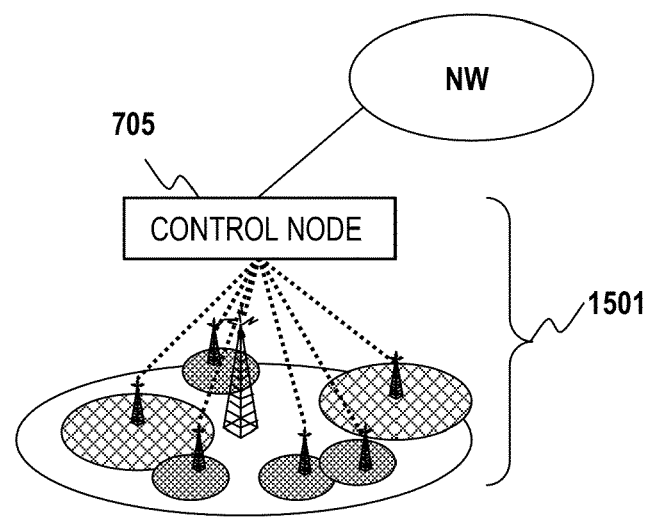
FIG. 15

COMMUNICATION SYSTEM USING MULTI-RADIO MODE, MONITOR NODE APPARATUS, CONTROL NODE APPARATUS AND BASE STATION APPARATUS

TECHNICAL FIELD

This invention particularly relates to a high-speed switching technique between a plurality of radio communication systems and to a cognitive radio technique for improving the time usage efficiency of radio frequency.

BACKGROUND ART

Currently, the third generation mobile system phones, wireless LAN systems and the like are each managed and operated by different providers. Thus, using plural services operated by plural providers requires signing up with each provider to subscribe the each service. In such a case, each provider owns a unique system, and thus, a terminal identifier which is necessary for network connection (for example, an IP address) is independently assigned to each system. Accordingly, plural IP addresses are generally required to use plural systems at the same time.

The bandwidth no more than 6 GHz, such as VHF, UHF and low microwave band, is suitable for mobile communication systems. However, the bandwidth has been used densely for the third generation mobile phones and wireless LAN, and tight condition of frequency has been a serious problem. Given the problem, frequency bandwidths necessary for mobile communications for which the needs are high must be secured while utilizing the tight condition of frequency effectively and efficiently. For that, a technique for achieving high utilization of common use of radio waves among systems which use different radio waves such as mobile communications must be attained.

The IT Strategic Headquarters in the Ministry of Internal Affairs and Communications has been trying to achieve such a technique in "e-Japan Priority Policy Program-2004" The program has been established in June 2004 for the purpose of achieving, by 2011, practical use of radio communication systems for establishing an optimum communication environment by accurately determining requirements for applications to be used and radio wave conditions of the neighbors, and flexibly making selections including frequency bandwidths, modulation mode and duplex mode.

In order to achieve such radio communication systems, the idea of "cognitive radio" for recognizing radio conditions and controlling resources of radio systems according to the radio conditions was published in 1999. For example, the cognitive radio technique is disclosed in Mitora, "Cognitive radio for flexible mobile multimedia communications", 1999 IEEE Int Workshop on Mobile Multimedia Communications Digest (November 1999), and Mitora, et.al., "Cognitive Radio: Making Software Radios More Personal", 1999 IEEE Personal Communication, Vol. 6, No. 4 (1999).

However, there are various approaches for achieving the cognitive radio and the approaches have been studied.

FIG. 1 shows an entire configuration of a system connected to plural radio systems according to a conventional technique. An example in FIG. 1 shows that the following three systems are connected: cdma 1xEVDO (1xEvolution Data Only) as a cellular system, WiMAX as a radio broadband system for outdoor use in urban areas and wireless LAN (wireless Local Area Network) as a broadband system for indoor use and short distances. Hereinafter, these three systems are used as examples for explaining a radio system of this invention, however, this invention is applicable to other radio systems having the functions equivalent to these three.

A system comprises a terminal 101 for communicating with the plural radio systems, access points 102, 103 and 104 for each radio system, gateways 105, 106 and 107 for terminating the each radio system, Authentication Authorization and Accounting (AAA) 109, 110 and 111 provided for the each system for user authentication, and an HA (Home Agent) for receiving by proxy a packet to be transmitted to a network to which a terminal apparatus normally belongs, and for forwarding the packet to the terminal apparatus. For example, the EVDO system includes the access point 102, packet data serving node (PDSN) 105 as a gateway, and EVDO-AAA (Authentication Authorization Accounting) 109 as an AAA. The wireless LAN system includes the access point 103, packet data interworking function (PDIF) 106 as a gateway, and WiFi-AAA 110 as an AAA for wireless LAN. The WiMAX system includes the access point 104, access service network gateway (ASN-GW) 107 as a gateway, and WiMAX-AAA 111 as an AAA.

The gateways 105, 106 and 107 for terminating the each system, the HA 108, and AAA 109, 110 and 111 are connected to each other via a network 112.

The access points 102, 103 and 104 for the each radio system are radio base stations for terminating radio links of the terminals.

The gateways such as PDSN 105, PDIF 106 and ASN-GW 107 each acts as an FA (Foreign Agent) for the HA 108, and terminate the radio systems. The FA accommodates the terminal apparatus in the network to which the terminal apparatus belongs. Moreover, the FA receives a packet to be transmitted to the terminal apparatus from the HA 108 in downlink and transmits the packet transmitted from the terminal apparatus to the HA 108 in uplink. In FIG. 1, although one access point is connected to one gateway of a radio system, the number of access points is not limited to one. Generally, plural access points are connected to each gateway.

In the conventional radio system, each of the systems is independently operated, and thus, AAA 109, 110 and 111 are independently provided as shown in FIG. 1. Therefore, user authentication is independently performed for every use of the each radio system.

At this time, the HA 108 monitors which radio system the terminal apparatus is currently using for communication. More specifically, PDSN 105 in EVDO, PDIF 106 in wireless LAN and ASN-GW 107 in WiMAX function as the FA when looked from the HA. The HA 108 holds an association between an IP address of the gateway in the radio system which is currently communicating and an IP address assigned to the terminal.

Next, explained with reference to FIG. 2 is a method for acquiring the IP address assigned to the terminal, a process in a case of switching a system to be used based on reasons such as moving of the terminal, and an association between the gateway and the IP address of the terminal.

When the terminal 101 is connected to EVDO, terminal authentication using PAP/CHAP is performed between the terminal 101 and PDSN 105 as shown in a connection procedure 201. Upon completion of the terminal authentication performed by PDSN 105, an access request from the terminal 101 is transmitted to EVDO-AAA 109. As a response to the request, EVDO-AAA 109 transmits information such as an IP address (IP=a.b.c.d) to be assigned to the terminal, DNS information and an IP address (IP=1.2.3.4) of the HA to PDSN 105. The IP address is then assigned to the terminal after PDSN 105 forwards the information from EVDO-AAA 109 to the terminal 101. At this time, the HA 108 holds an association 202 between the IP address (IP=a.b.c.d) of the terminal and an IP address (IP=x.x.x.x) of PDSN acting as the FA.

In a case where, for example, the terminal is to newly connected to a different wireless LAN system from EVDO by moving (205) as shown in a connection procedure 203, for example, terminal authentication is performed using IKEv2 between the terminal and PDIF 106 which is a wireless LAN gateway. Upon completion of the terminal authentication performed by PDIF 106, an access request from the terminal 101 is transmitted to the WiFi-AAA 110.

As a response to the request, WiFi-AAA 110 transmits information such as an IP address (IP=e.f.g.h) to be assigned to the terminal, DNS information and the IP address (IP=1.2.3.4) of the HA to PDIF 106. The IP address is assigned to the terminal after PDIF 106 forwards the information to the terminal 101 from WiFi-AAA 110. At this time, the HA 108 holds an association 204 between the IP address (IP=e.f.g.h) of the terminal and an IP address (IP=y.y.y.y) of PDIF acting as the FA.

As has been described, in the conventional system, the switching among the plural radio systems requires user authentication for each system and different IP addresses are assigned to the terminal along with the switching among the systems. In addition, the user authentications are performed from the terminal through the gateway every time the radio system is switched, and thus, the switching takes second order time. In a case of a handover in which plural gateways are connected in the same system, no switching of systems occur even the terminal moves. Accordingly, the same IP address is assigned to the terminal. This is shown in FIG. 3.

When the terminal 101 is connected to the wireless LAN, as described with reference to FIG. 2 and as shown in the connection procedure 203, after the user authentication using IKEv2 is performed, the IP address (IP=e.f.g.h) of the terminal is assigned by the WiFi-AAA 110. In a case where the terminal moves (303) and is under different PDIF in the same wireless LAN system, another terminal authentication between the terminal 101 and PDIF 304 to be connected is performed as shown in a connection procedure 301. The WiFi-AAA 109 checks that the terminal has been already registered in the same system in order to assign the same IP address.

At this time, the HA 108 recognizes that the terminal 101 is in handover status. In other words, the terminal 101 is in a state of being able to forward data via the both gateways. Accordingly, both of PDIF 106 and PDIF 304 are registered as the FAs in an association 302. At this time, the data from its corresponding node on the network side checks the association 302 held in the HA 108 and is multicasted to each of PDIF 106 and PDIF 304.

When the handover of the terminal 101 is then completed and the terminal 101 is completely connected only to PDIF 304 which is the destination, only the IP address of the FA which is IP=z.z.z.z is associated with the IP address of the terminal which is IP=e.f.g.h in the association 302.

As has been described, in the conventional system, the HA 108 is capable of holding plural FA addresses for one IP address of the terminal in the same system. However, in this case, data to be transmitted to the terminal 101 is multicasted to each FA. In addition, user authentication is performed each time the gateway changes, and thus takes second order time for switching the radio system.

DISCLOSURE OF THE INVENTION

In the conventional system, the third generation mobile system phones, wireless LAN systems and the like are each managed and operated by different providers. Thus, using plural services operated by plural providers requires signing up with each provider for subscribing each service. In such a case, each provider owns a unique system, and thus, a terminal identifier which is necessary for network connection (for example, an IP address) is independently assigned to each system. Accordingly, plural IP addresses are generally required to use plural systems at the same time.

Further, a proper switch of radio systems according to radio conditions requires a system switch performed within millisecond order due to radio channel variations. However, in a radio environment where plural radio systems can be used, when the plural radio systems are switched, user authentication is required for each switching of the radio system as well as switching of sessions. Consequently, milli-second order time is required for switching the radio systems, which causes a problem that high-speed switching of the systems according to the radio conditions cannot be achieved.

There is also a problem that when an application for streaming communication (for example, streaming communication mainly with images and voice communications in VoIP) is used, speech is instantaneously interrupted and images are broken by the switching of systems regardless of the radio conditions.

In addition, in the conventional system, plural IP addresses of the FA can be associated with one IP address of a terminal in the same system. However, since data to be transmitted to the terminal which is in handover status is multicasted to each FA, as a whole radio system, there arise problems of using radio resources twice as much and decreasing the number of users that can be connected/transmitted simultaneously in the system.

Further, in the conventional system, which system is to be used in the radio environment where plural radio systems can be used currently depends on users' intentions or users' manual operations. Therefore, as a whole system, variations in the number of users to be connected occur, and thus, the load on the system becomes higher (consequently, high load makes the connection difficult.) As a result, not only individual user throughputs but also throughputs as the whole system are decreased.

An object of this invention is to share AAA provided for each radio system and to assign one IP address to a terminal no matter how many systems are used.

A control node which is capable of switching a radio system transmitting data for each packet is then provided on the upper side of gateways of the each system. With this, a system which should look to its corresponding node as if communication is performed using one IP address can be achieved.

Moreover, seamless switching system is achieved by eliminating the time taken for switching sessions and the like caused by the switching of radio systems.

Furthermore, pieces of information such as information on radio conditions, information on the number of terminals being connected to the access points and information on a processing load of the access points, etc. are collected from the access points for the each radio system. The collected information is statistically processed by a monitoring node in order to accurately identify the radio conditions.

A representative aspect of this invention is as follows. That is, there is provided a communication system which includes plural radio systems, and which connects to a terminal apparatus corresponding to the plural radio systems, comprising access points for the each radio system; gateways for terminating the each radio system; an authentication apparatus; and a home agent for receiving by proxy a packet to be forwarded to a network and forwarding the packet to the terminal apparatus. The authentication apparatus, in a case where the radio system connected to the terminal is switched, assigns a same IP address which has been assigned before the switching.

According to the aspect of the present invention, a radio system to be used can be switched for each packet according to the radio conditions which change frequently. Accordingly, the radio system improves user throughputs and load balancing of the whole system. Consequently, throughputs of the whole system improve.

BRIEF DESCRIPTION OF THE DRAWINGS

FIGS. 14A and 14B are diagrams showing relations between a cognitive base station and service areas of each radio system according to the embodiment of this invention.

FIG. 15 is a diagram showing relations between the cognitive base station and service areas of each radio system according to the embodiment of this invention.

BEST MODE FOR CARRYING OUT THE INVENTION

<First Embodiment>

A first embodiment of this invention is described.

Figure 1:
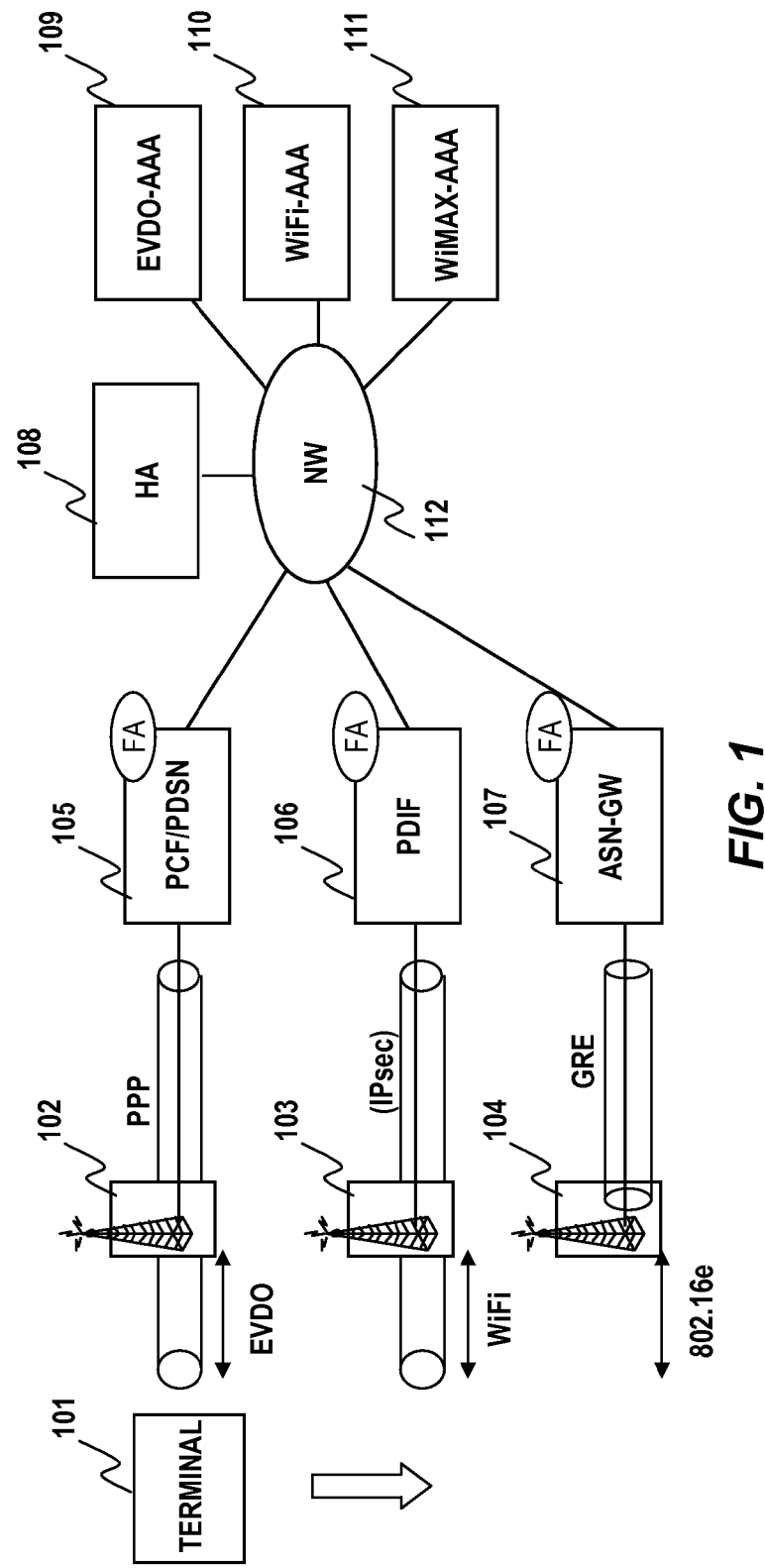
FIG. 1 is a configuration diagram showing a system accommodating plural radio systems according to a conventional technique.
Figure 2:
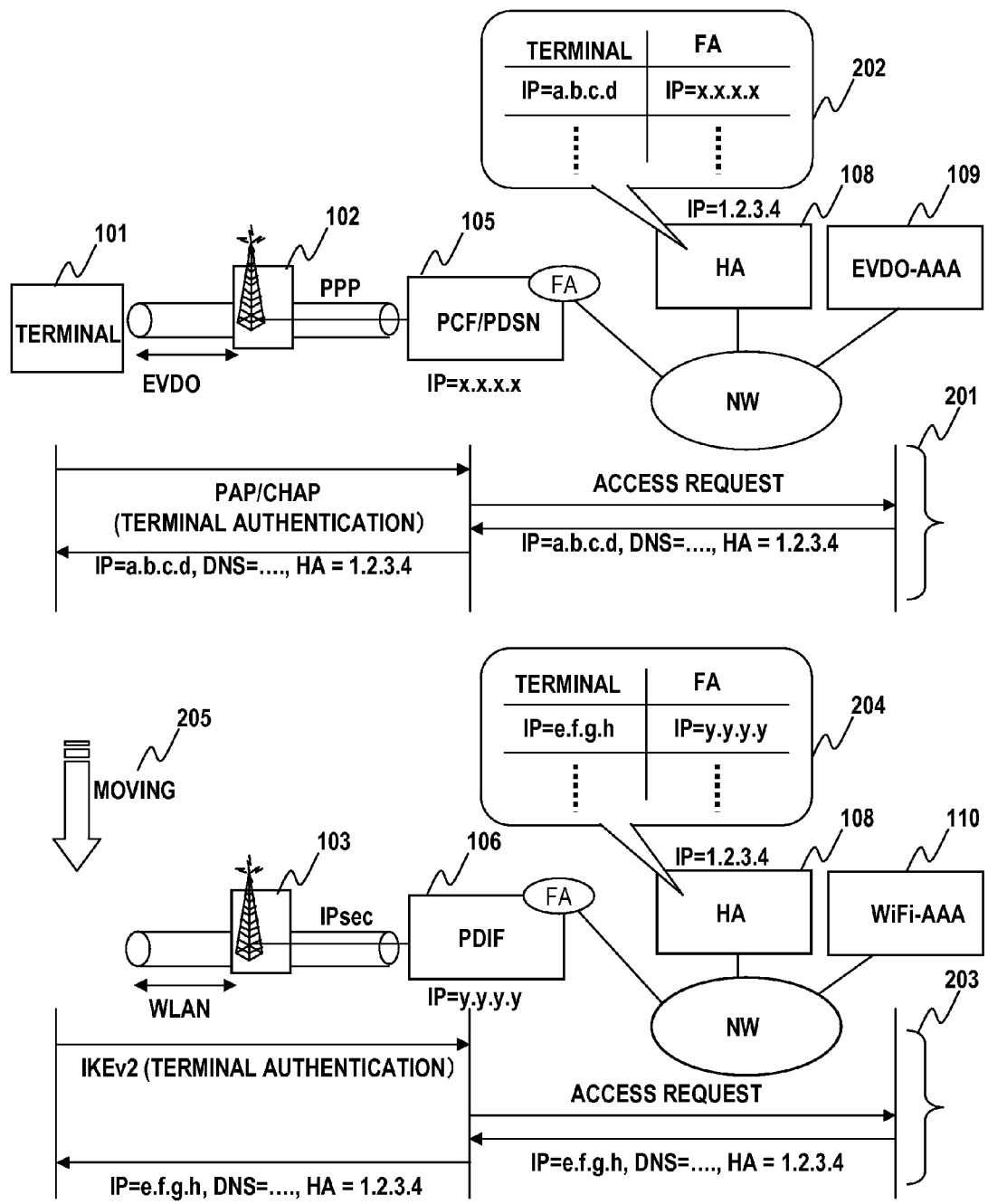
FIG. 2 is a sequence diagram showing an IP address assignment process performed in a case where a terminal moves between systems according to the conventional system.
Figure 3:
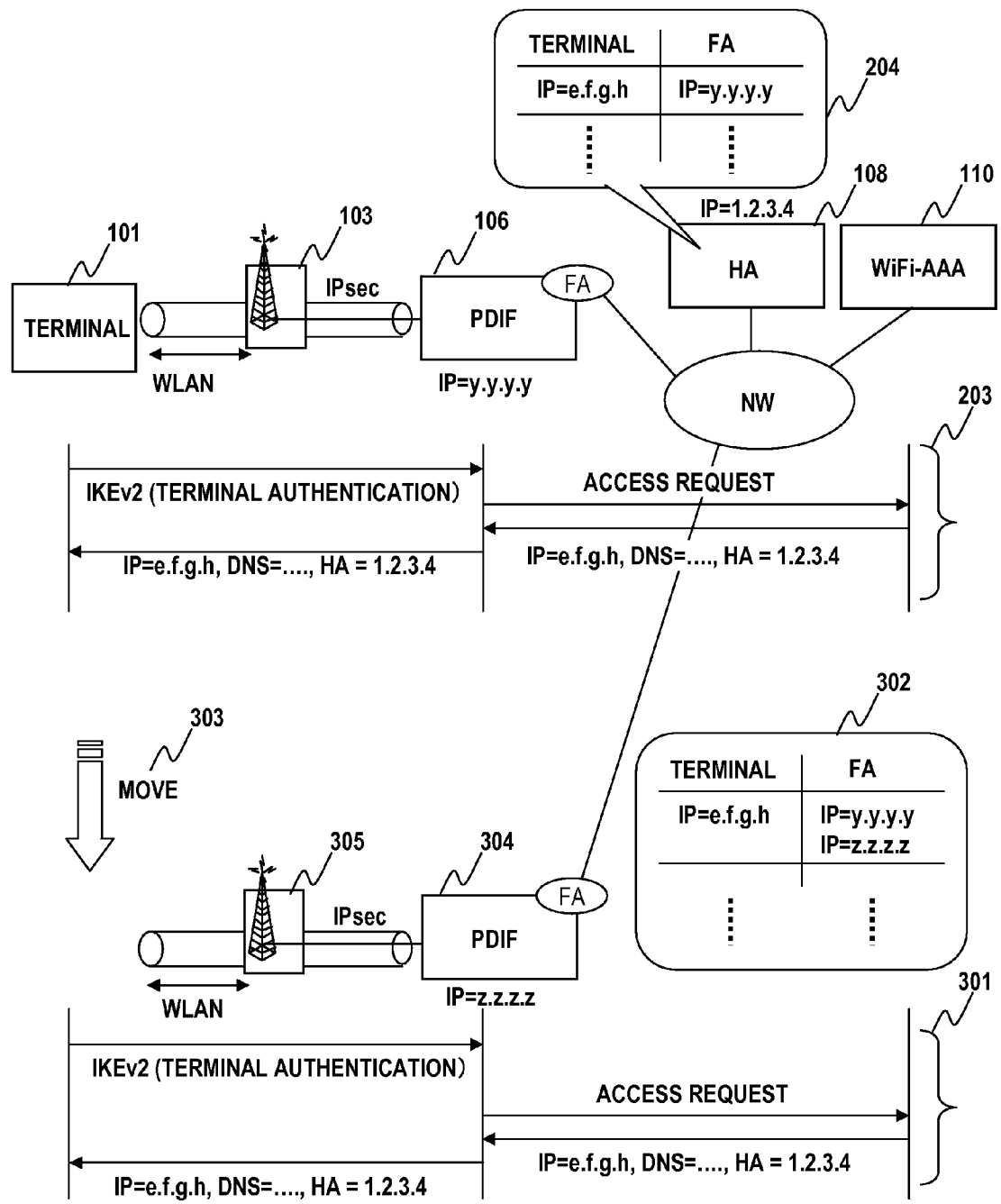
FIG. 3 is a sequence diagram showing an IP address assignment process performed in a case where a terminal moves between different gateways in a same system according to the conventional system.
Figure 4:
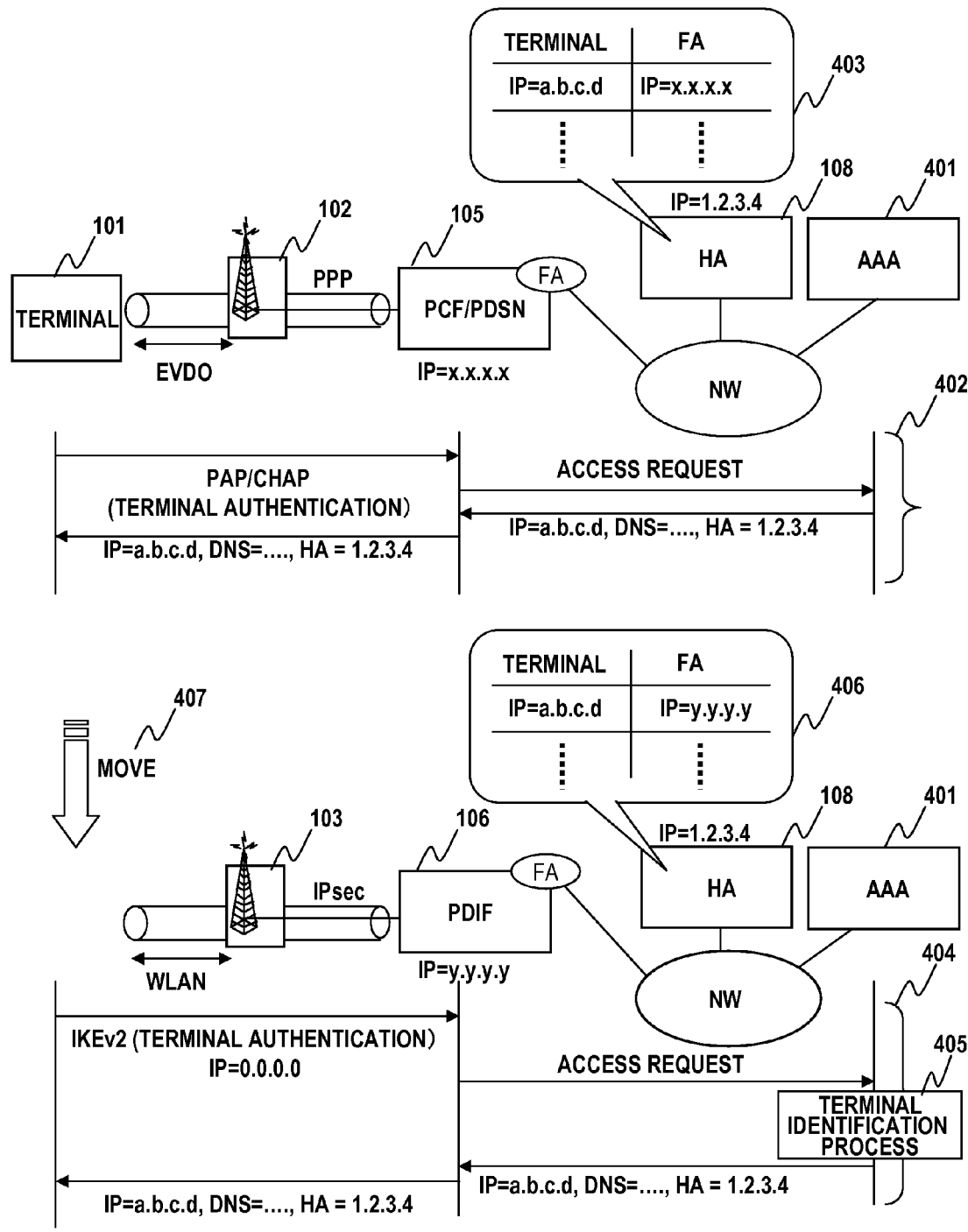
FIG. 4 is a sequence diagram showing an IP address assignment process performed in a case where a terminal moves between systems according to a first embodiment of this invention.

In the first embodiment, as shown in FIG. 4, each of the plural radio systems does not have its own AAA but has a common AAA 401 for the plural radio systems.

A process of assigning a same IP address to a terminal currently communicating while switching between different systems is described with reference to FIG. 4.

In a case where a terminal 101 is connected to an EVDO system, terminal authentication using PAP/CHAP is performed between the terminal 101 and PDSN 105 which is an EVDO gateway as shown in a connection procedure 402. Upon completion of the terminal authentication performed by PDSN 105, an access request from the terminal 101 is transmitted to the common AAA 401.

As a response to the request, the common AAA 401 transmits information such as an IP address (IP=a.b.c.d) to be assigned to the terminal, DNS information and an IP address (IP=1.2.3.4) of an HA to PDSN 105. The IP address is assigned to the terminal after PDSN 105 forwards the information from the common AAA 401 to the terminal 101. At this time, an HA 108 holds an association 403 between the IP address (IP=a.b.c.d) of the terminal and an IP address (IP=x.x.x.x) of PDSN acting as an FA. The same process as that of the previously described conventional technique is performed up to here.

Subsequently, in a case where the terminal moves (407) and, for example, is to be newly connected to a different wireless LAN system from EVDO, as shown in a connection procedure 404, for example, terminal authentication using IKEv2 between the terminal 101 and PDIF 106 which is a wireless LAN gateway is performed. Since the IP address has not been assigned to the terminal at the time of terminal authentication using IKEv2, a predetermined IP address value (for example, IP=0.0.0.0) which indicates that the IP address has not been assigned is included in a connection request as one of parameters. The terminal 101 includes an identifier unique to the terminal in the connection request. The identifier unique to the terminal is, for example, a product number of the terminal, a SIM card number, a telephone number and so on.

Upon completion of the terminal authentication performed by PDIF 106, an access request from the terminal 101 is transmitted to the common AAA 401. This access request also includes the identifier unique to the terminal transmitted from the terminal 101.

The common AAA 401 holds, as database, the identifier unique to the terminal. The common AAA 401 performs terminal identification process (405) to determine, by checking the database using the identifier unique to the terminal transmitted from the terminal 101, whether the terminal 101 is the same terminal having an IP address assigned through the communication using other radio system. If the access request is determined to be from the same terminal, as shown in the connection procedure 404, the common AAA 401 gives an instruction to assign the same IP address (IP=a.b.c.d) which has been previously assigned through EVDO to the terminal. In this case, the HA 108 holds the IP address of the terminal while updating the IP address of the FA, which the data to the terminal 101 goes through, to an IP address (IP=y.y.y.y) of PDIF 106.

Meanwhile, based on a result of the terminal identification process 405 performed by the common AAA 401, if the access request is determined to be from a new terminal to which an IP address has not been assigned through the communication using other radio system, a new IP address held in the common AAA 401 is assigned to the terminal.

As has been described, even in the case where systems are switched between plural radio systems, the same IP address can be assigned to the same terminal according to the first embodiment.

<Second Embodiment>

Next, a second embodiment of this invention is described.

Figure 5:
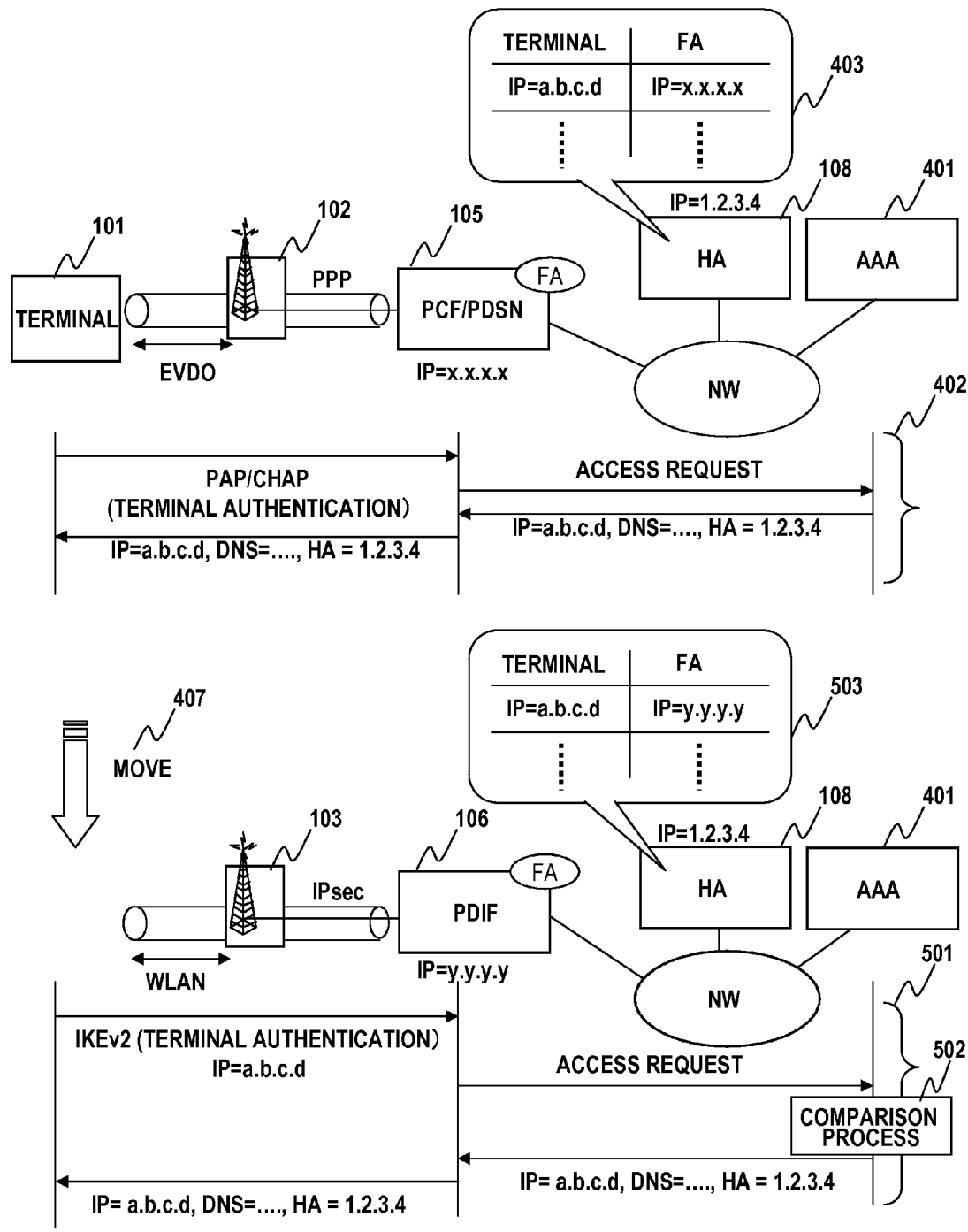
FIG. 5 is a sequence diagram showing an IP address assignment process performed in a case where a terminal moves between different gateways in a same system according to a second embodiment of this invention.

In the second embodiment, as shown in FIG. 5, a common AAA 401 is also shared by plural radio systems as above-described in the first embodiment.

A process of assigning a same IP address to a terminal which is currently communicating while switching between different systems according to the second embodiment is described with reference to FIG. 5.

In a case where terminal authentication using PAP/CHAP is performed between the terminal 101 and PDSN 105 which is an EVDO gateway as shown in a connection procedure 402. Upon completion of the terminal authentication performed by PDSN 105, an access request from a terminal 101 is transmitted to the common AAA 401.

As a response to the request, the common AAA 401 transmits information such as an IP address (IP=a.b.c.d) to be assigned to the terminal, DNS information and an IP address (IP=1.2.3.4) of an HA to PDSN 105. The IP address is assigned to the terminal after PDSN 105 forwards the information from the common AAA 401 to the terminal 101. At this time, an HA 108 holds an association 403 between the IP address (IP=a.b.c.d) of the terminal and an IP address (IP=x.x.x.x) of PDSN acting as an FA. The same process as that of the previously described conventional technique is performed up to here.

Subsequently, in a case where the terminal moves (407) and, for example, is to be newly connected to a different wireless LAN system from EVDO, as shown in a connection procedure 501, for example, terminal authentication using IKEv2 between the terminal 101 and PDIF 106 which is a wireless LAN gateway is performed. At the time of terminal authentication performed using IKEv2, the authentication as wireless LAN and the assignment of an IP address have not been completed, the IP address (IP=a.b.c.d) assigned through EVDO, which is the IP address value (IP=a.b.c.d) to be used for connection to the wireless LAN is included in a connection request as one of parameters. The access request also includes the IP address (IP=a.b.c.d) which has been assigned in the previous connection, and which is transmitted from the terminal 101.

Upon completion of the terminal authentication performed by PDIF 106, the access request from the terminal 101 is transmitted to the common AAA 401.

The common AAA 401 performs a comparison process to determine whether the terminal 101 is the same terminal having an IP address assigned through the communication using other radio system (502). If the access request is determined to be from the same terminal, as shown in the connection procedure 501, the common AAA 401 gives an instruction to assign the same IP address (IP=a.b.c.d) which has been previously assigned through EVDO to the terminal. In this case, the HA 108 holds the IP address of the terminal while updating the IP address of the FA, which the data to the terminal 101 goes through, to an IP address (IP=y.y.y.y) of PDIF 106.

Meanwhile, based on a result of the comparison process 502 performed by the common AAA 401, if the access request is determined to be from a new terminal to which an IP address has not been assigned through the communication using other radio system, the request IP address is checked to be within a range of the IP address held in the common AAA 401. In a case where the IP address transmitted from the terminal 101 is within the IP addresses held in the common AAA 401, the IP address (IP=a.b.c.d) which the terminal requested is assigned to the terminal.

On the other hand, in a case where the IP address transmitted from the terminal 101 is not within the IP addresses held in the common AAA 401, a new IP address held in the common AAA 401 is assigned to the terminal.

Note that when the comparison process (502) is performed, the terminal can be authenticated by using an identifier (a manufacturing number of the terminal, a SIM card number, a telephone number and so on) unique to the terminal. The common AAA 401 holds, as database, the identifier unique to the terminal and checks the database in a case where an access request is received.

As has been described, even in the case where systems are switched between plural radio systems, the same IP address can be assigned to the same terminal according to the second embodiment.

<Third Embodiment>

Next, a third embodiment of this invention is described.

The third embodiment is an embodiment which is the combination of the first and the second embodiments described above. The third embodiment differs from the first and the second embodiments in authentication parameters included in a connection request transmitted from a terminal, and terminal identification/comparison process performed by a common AAA based on the difference in the authentication parameters. Accordingly, if the common AAA is capable of performing the both, the both systems can be combined.

Figure 6:
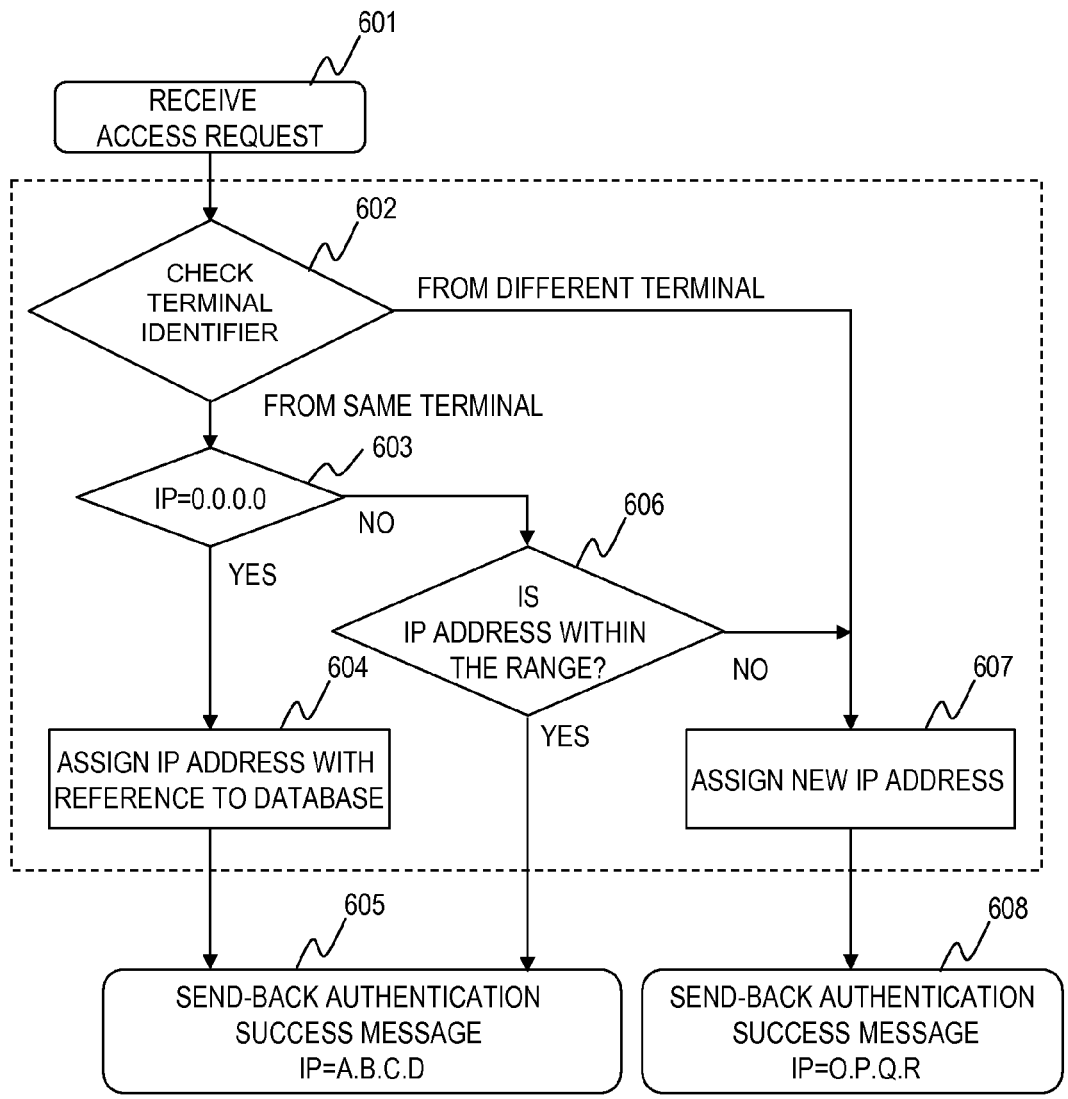
FIG. 6 is a flow chart showing an IP address assignment process according to a third embodiment of this invention.

FIG. 6 shows a flow chart for the common AAA according to the third embodiment. In both systems, in a case where an access request is received, the request is judged whether the request is from the same terminal by using an identifier unique to the terminal (602). The IP address included in the connection request as a parameter transmitted from the terminal is then checked and an IP address is assigned to the terminal according to the request. A response of successful authentication is transmitted together with the IP address to be assigned to the terminal (605 and 607).

Namely, if the connection request is judged to be from the terminal connected through other radio system by checking the transmitted identifier unique to the terminal, the IP address is then judged whether the IP address has a predetermined value (IP=0.0.0.0)(603).

From the result, in a case where the IP address transmitted from the terminal is judged to have the predetermined value, the terminal requested for the connection is determined that an IP address has not been assigned. Thus, the IP address (which has been assigned through the previous connection) corresponding to the transmitted identifier unique to the terminal is assigned to the terminal (604).

On the other hand, if the IP address transmitted from the terminal does not have the predetermined value, the IP address (which has been assigned through the previous connection) requested by the terminal is judged whether the IP address is within the IP address managed by the common AAA (606).

In a case where the IP address is judged to be within the predetermined value, the IP address requested by the terminal is judged to be correct and the requested IP address by the terminal is assigned to the terminal.

On the other hand, in a case where the IP address is determined not to be within the predetermined value, the IP address requested by the terminal is judged to be incorrect and one of the IP addresses managed by the common AAA is assigned to the terminal (607).

Note that, in a case where the IP address transmitted from the terminal is judged not to have the predetermined value, the request is judged whether the request is from the same terminal by using the identifier unique to the terminal, in Step 606, and the IP address (which has been assigned through the previous connection) corresponding to the transmitted identifier unique to the terminal may be assigned to the terminal.

Note that, as similar to the case of the first embodiment, if the identifier unique to the terminal is included in the connection request, the process proceeds in the order of Step 601, Step 602, Step 603, Step 604 and Step 605 or the order of Step 601, Step 602, Step 607 and Step 608 in FIG. 6.

Meanwhile, as similar to the case of the second embodiment, if the IP address assigned through the previous connection is included in the connection request, the process proceeds in the order of Step 601, Step 602, Step 603, Step 606 and Step 605, or Step 601, Step 602, Step 603, Step 606 and Step 607 and Step 608.

<Fourth Embodiment>

Next, a fourth embodiment of this invention is described.

Figure 13:
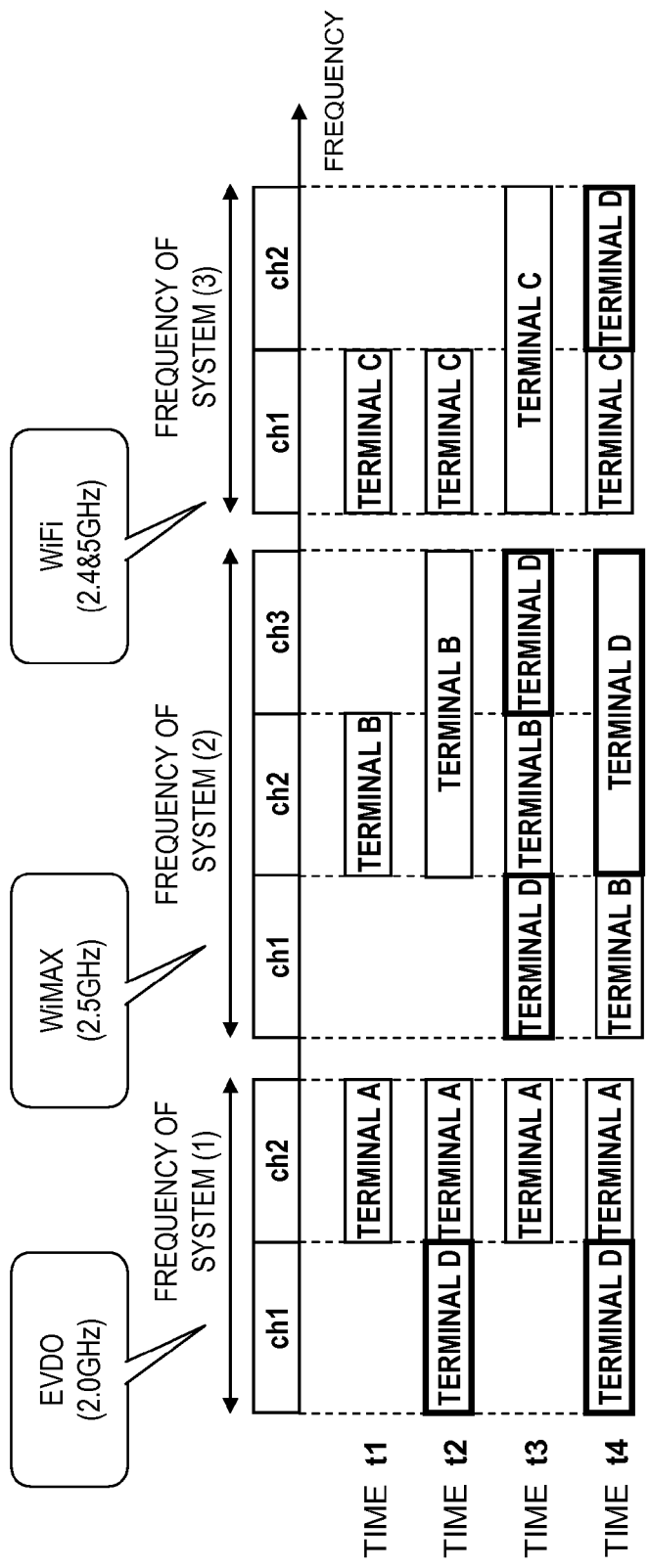
FIG. 13 is a conceptual diagram showing frequencies of the plural systems and control of time resources according to the embodiment of this invention.

Conditions for a use of plural radio systems are described with reference to FIGS. 13, 14 and 15. In Japan, bandwidths for each system is assigned as 2.0 GHz bandwidth for EVDO, 2.4 GHz bandwidth for a wireless LAN and the like as shown in FIG. 13. The radio conditions and conditions for unused radio resources change frequently, and thus, radio resources to be used are required to be properly switched to meet users' requests.

From the viewpoint that the area in which the plural radio systems can be used, for example, one base station apparatus is assumed to support the three radio systems (EVDO, WiMAX, wireless LAN) as shown in FIG. 14A. The service area from the base station differs due to restrictions such as frequency bandwidths and transmission power used for each system. In other words, EVDO which is cellular has the widest service area and the wireless LAN of which frequency bandwidth is high and the transmission power is low has the narrowest service area. Accordingly, only the vicinity of the base station apparatus can be used for the all radio systems as shown in FIG. 13.

Therefore, it is considered to provide plural access points for the system such as the wireless LAN of which the service area is narrow. For example, as shown in FIG. 14B, plural access points are provided for each of the wireless LAN and WiMAX in one EVDO covered area. Accordingly, it is possible to expand the area in which the resources of the plural systems as shown in FIG. 13 can be properly switched.

Here, as shown in FIG. 15, it is convenient in terms of resource control if the radio resources for all the plural access points are used as a resource of a virtual cognitive base station 1501. A terminal seems to be virtually connected to one base station 1501 when looked from the terminal. Thus, data seems to be forwarded to one base station from the corresponding node of the terminal connected to the virtual base station. Consequently, complicated processes at the IP level are eliminated.

Figure 7:
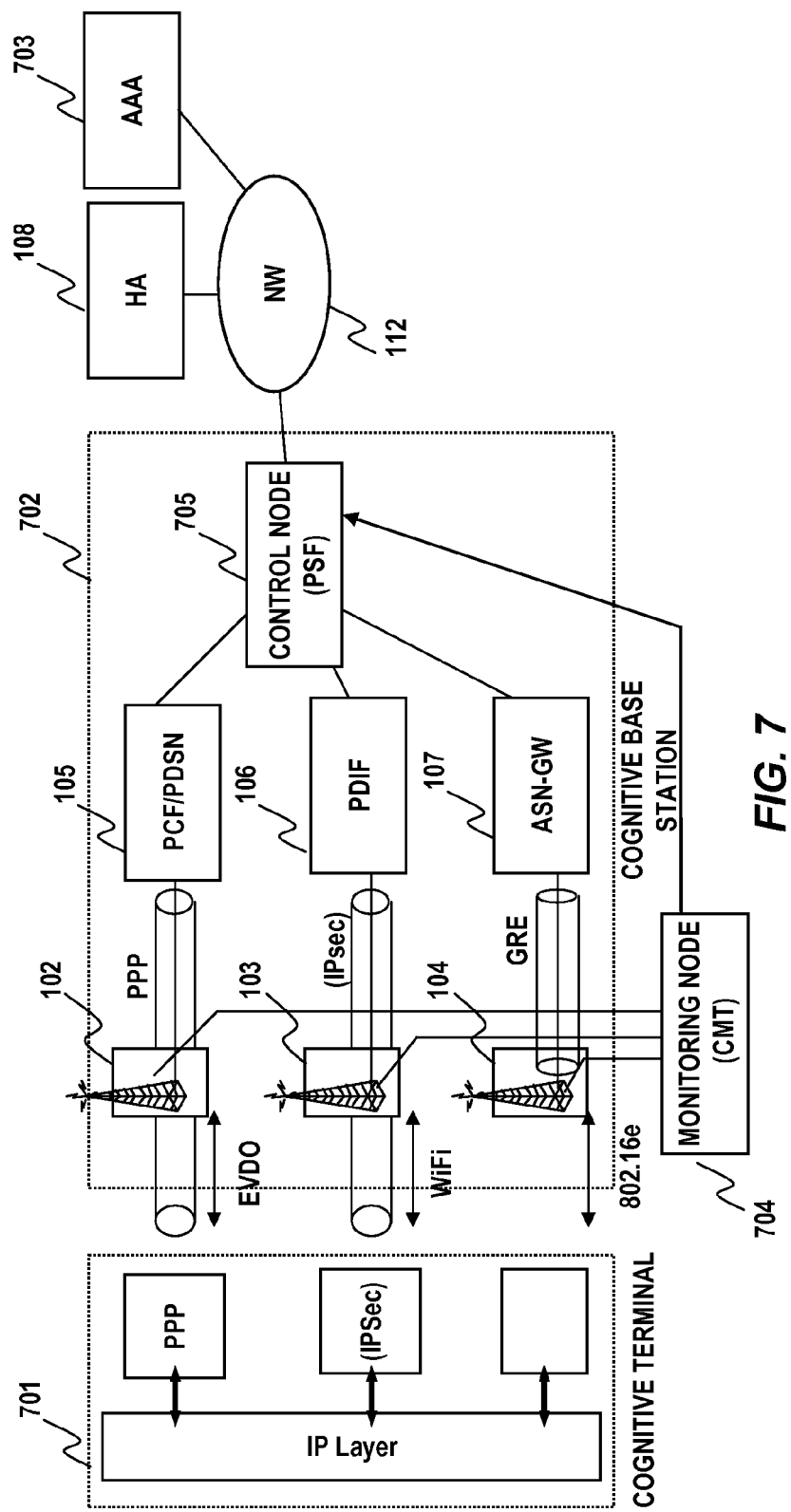
FIG. 7 is a configuration diagram showing a system accommodating plural radio systems according to a forth embodiment of this invention.

Described with reference to FIG. 7 is a system configuration that makes it possible to change a radio system in which data is forwarded according to radio conditions, and with which providing a virtual base station can be considered, for each packet.

A monitoring node (Cognitive Monitoring Tool: CMT) 704 is provided for recognizing each radio condition for each radio systems and for collecting radio environment information related to the radio from the access points for the each system. The information related to the radio are received power, received signal strength indicator (RSSI), throughputs of each user, transmission speed, packet loss, the number of terminals connected in the access points, processing loads in the access points and the like. In case of EVDO, a downlink rate control (DRC) value, a reverse link rate information (RRI) value, values of various parameters used for scheduling between radio sections may be used as radio information.

The monitoring node 704 performs statistical processing on the collected radio information, and adds the statistically processed radio information to spacial information such as positions of the terminal and the moving directions. Accordingly, a radio system for performing communication is determined on packet-by-packet basis.

A control node (packet switching function: PSF) 705 is provided between the upper side of gateways 105, 106 and 107 and a network 112. The control node 705 switches packets according to instructions from the monitoring node 704.

Moreover, an AAA 703 shared by the plural systems is provided for assigning a same IP address used among plural radio systems to a terminal using the plural radio systems as described in the first, the second and the third embodiments.

Figure 8:
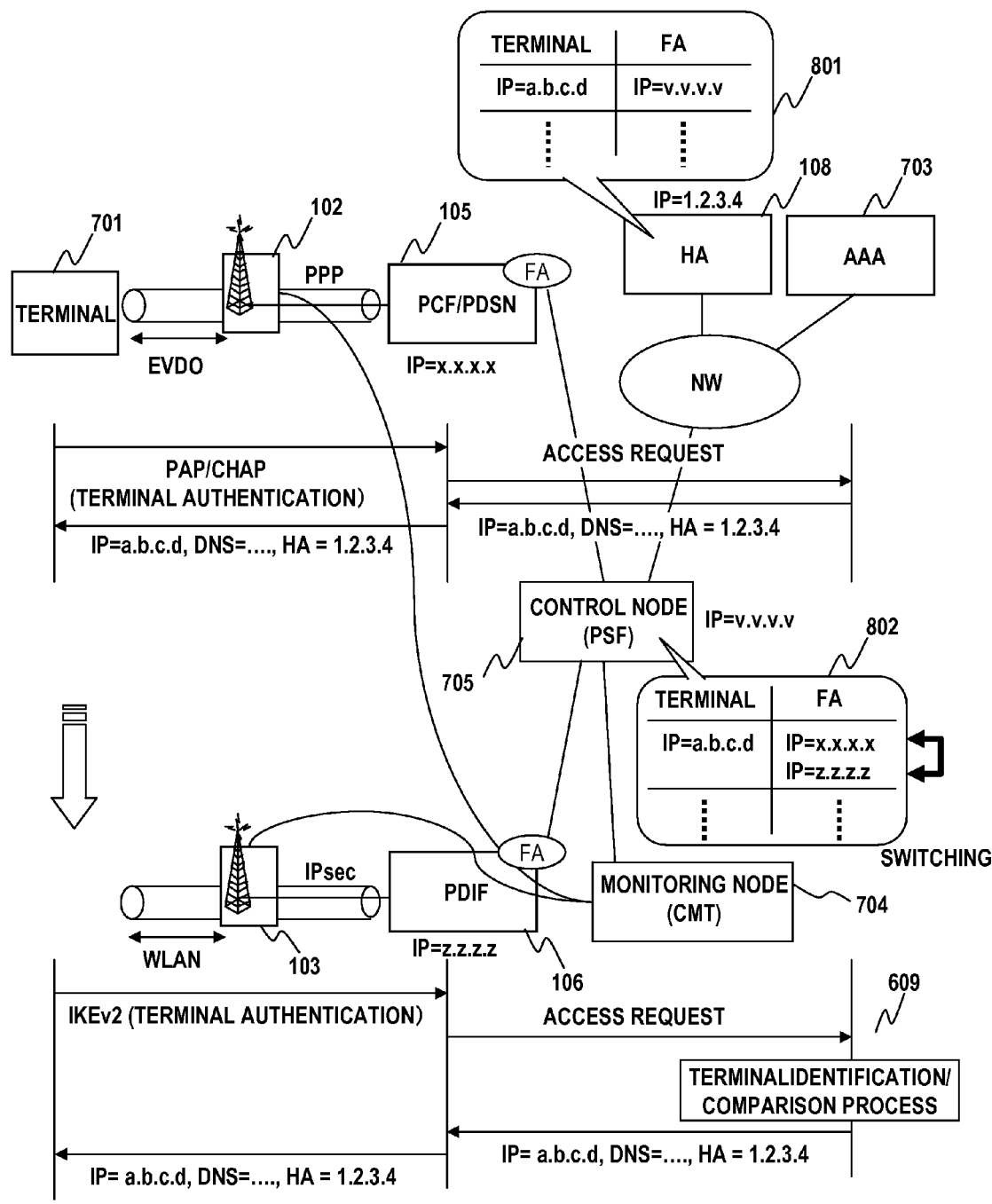
FIG. 8 is a sequence diagram showing an IP address assignment process in a case where a terminal moves between systems according to the forth embodiment of this invention.

FIG. 8 shows a detailed process for switching radio systems for each packet.

FIG. 8 shows a condition that a user who first used EVDO to forward a packet now uses the wireless LAN due to a change in radio condition such as moving. The process previously described in the first, the second and the third embodiments can also be used for assigning a same IP address to a terminal in the forth embodiment.

The control node 705 is assumed to have a hierarchical configuration which seems to be one FA when looked from an HA 108 and seems to be the HA from the gateways 105 and 106 in the each system. In other words, as shown in an association 801, in the FA associated with the IP address (IP=a.b.c.d) of the terminal, only one IP address (IP=v.v.v.v) of the control node 705 is registered. Meanwhile, the control node 705 holds an association 802 in which the IP address (IP=x.x.x.x) of the terminal and plural FAs (the IP address=a.b.c.d of PDSN and IP address=z.z.z.z of PDIF) are associated.

Moreover, upon reception of packets to be transmitted to the IP address (IP=a.b.c.d), the control node 705, based on the association 802, determines which FA is associated with each packet according to an instruction from the monitoring node 704. Accordingly, the control node 705 switches the packets to one of connected plural FAs. Note that, the each packet may be multicasted to plural systems. However, the each packet is judged whether to be multicasted or not because resources of the plural systems are used.

Figure 11:
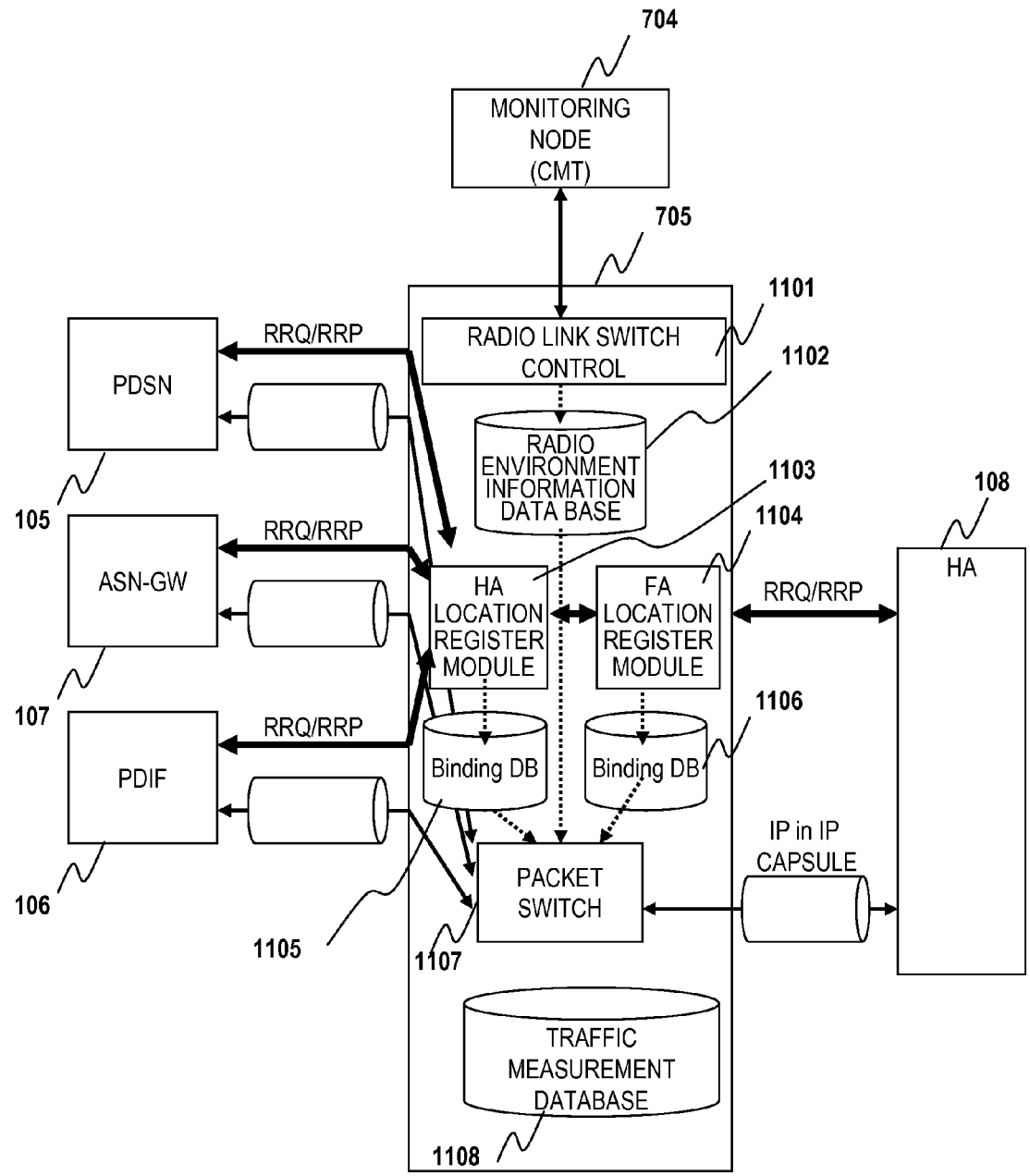
FIG. 11 is a block diagram showing functions of a control node according to the forth embodiment of this invention.

Next, functions of the control node 705 are described with reference to FIG. 11.

The control node 705 comprises an FA location registration module 1104 and a binding database 1106 which stores information for FA location registration because the control node 705 acts as an FA for the HA 108 on the upper side. In addition, the control node 705 comprises an HA location registration module 1103 and a binding database 1105 which stores information for HA location registration because the control node 705 acts as an HA for PDSN 105, PDIF 106 and ASN-GW 107 on the lower side.

Further more, the control node 705 is connected to the monitoring node 704. The monitoring node 704 inputs, to a radio environment information database 1102, information for determining which radio system is used to forward packets. A radio link switch control module 1101 controls to switch the packets to be forwarded into the each radio link according to the stored information in the radio environment information database 1102. A packet switch 1107 switches the packets according to an instruction from the radio link switch control module 1101.

Furthermore, the control node (705) comprises a traffic measurement database 1108 for measuring traffic of packets in the control node and storing measured results of the traffic. The measured results of the traffic are notified to the monitoring node 704 and used for load balancing on the systems, connection restrictions and the like.

Figure 12:
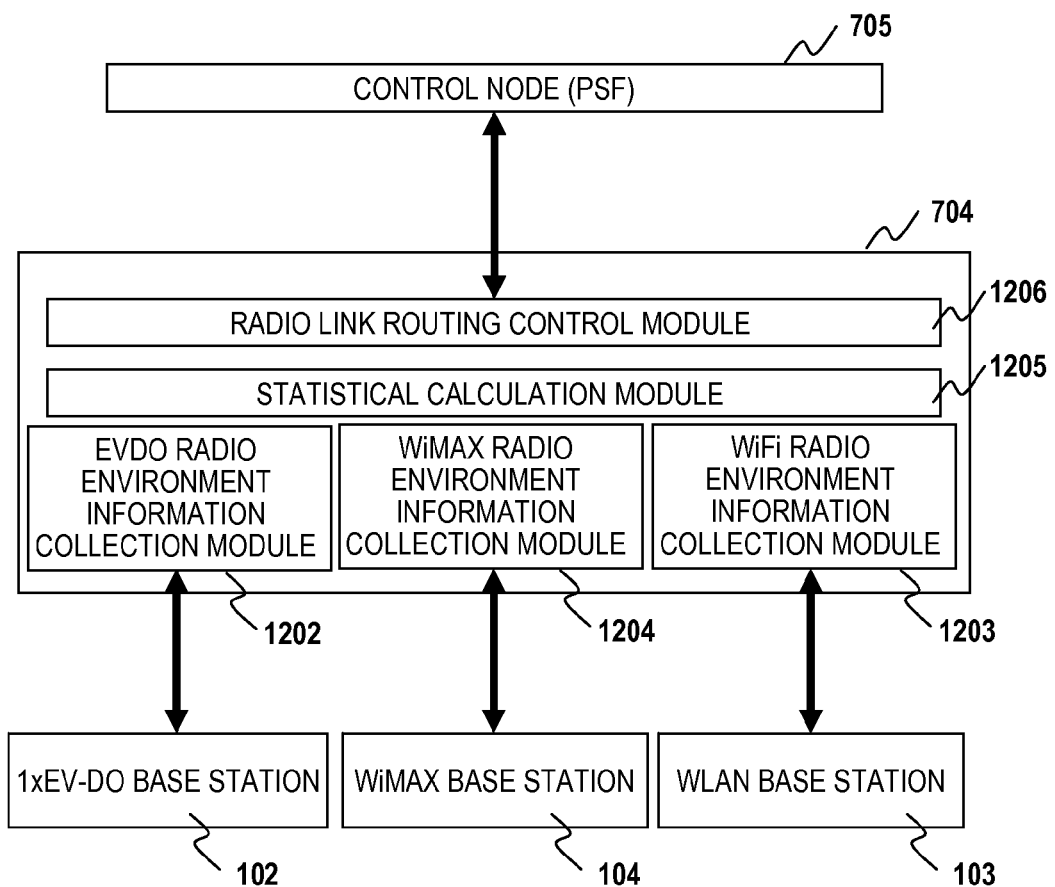
FIG. 12 is a block diagram showing functions of a monitoring node according to the forth embodiment of this invention.

Next, functions of the monitoring node 704 are described with reference to FIG. 12.

The monitoring node 704 comprises an EVDO radio environment information collection module 1202 for collecting radio information from an EVDO base station 102, a WiFi (wireless LAN) radio environment information collection module 1203 for collecting radio information from a wireless LAN access point 103 and a WiMAX radio environment information collection module 1204 for collecting radio information from a WiMAX access point 104.

The EVDO radio environment information collection module 1202 collects information such as RSSI, RRI values, DRC values, values of unicast access terminal identifiers (UATI) of the connected terminals, and the number of terminals connected to the access points.

The WiFi radio environment information collection module 1203 collects information such as RSSI, packet loss, transmission speed to the connected terminals, the number of associations (connected terminals), and MAC addresses of the connected terminals.

The WiMAX radio environment information collection module 1204 collects information such as RSSI, transmission speed to the connected terminals, error rates, the number of connected terminals, and MAC addresses of the connected terminals.

The collected radio information is statistically processed by a statistical calculation module 1205. For example, the RSSI reported from the access points for each radio system are each quantified in a different manner at different ranges. Further, the period of these collections also differs. Accordingly, the radio information is normalized by correcting the differences between the radio systems to compare RSSI of the plural radio systems, correcting the accuracy of RSSI in consideration of the number of the collection and the like. This conversion of the collected radio information makes the radio information collected in different forms from the each radio system at the different timings (collecting intervals) comparable.

Next, a radio link routing control module 1206 compares various radio information which have been statistically processed and normalized between each system in order to select a radio communication system for forwarding the packets. In other words, the radio link routing control module 1206 selects a radio link to be used. Information on the selected radio link is transmitted to the control node 705.

Figure 9:
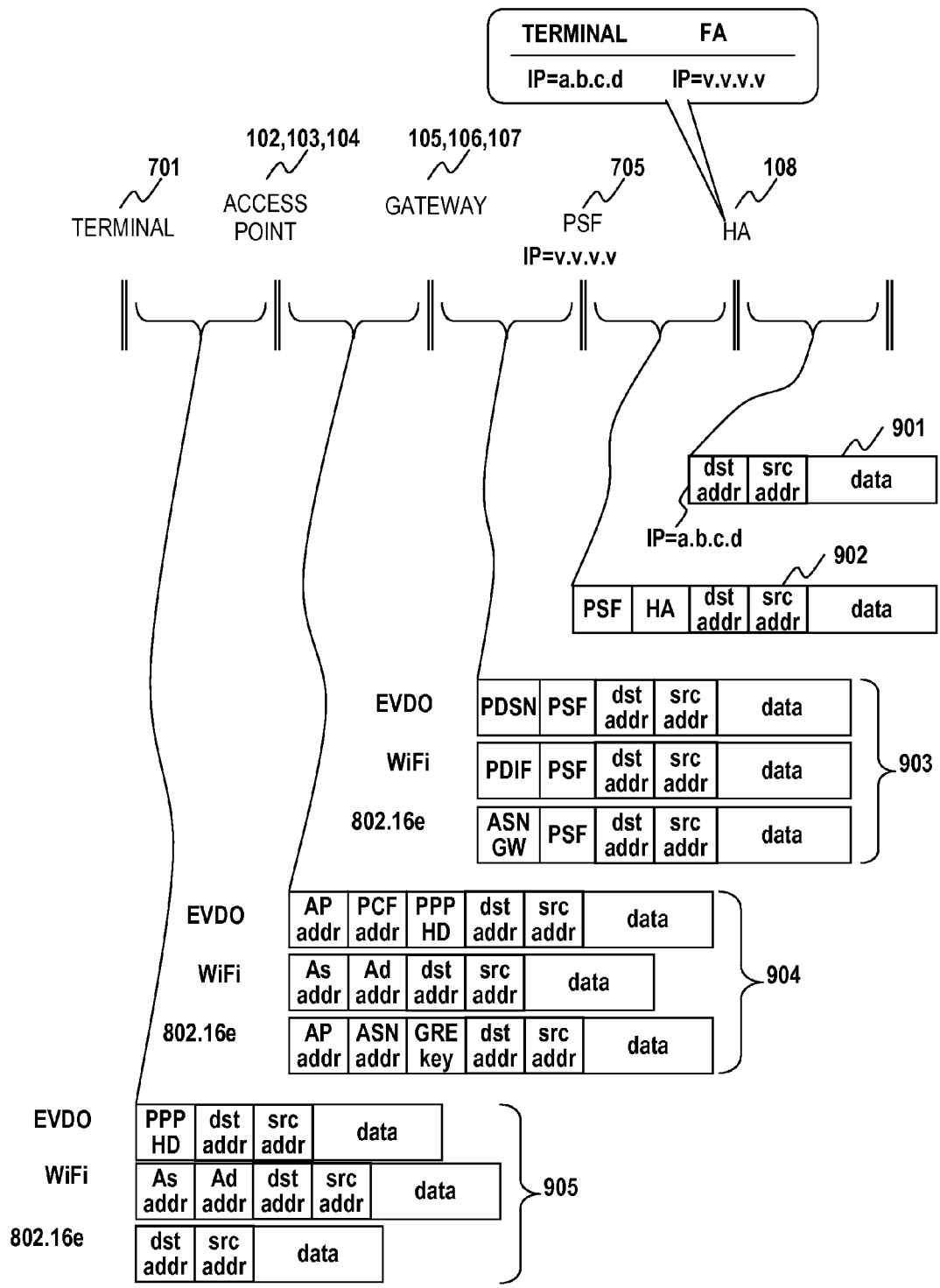
FIG. 9 is an explanatory diagram showing capsulation of an IP packet according to the forth embodiment of this invention.

Next, a process of switching packets performed by the control node is described with reference to FIG. 9.

An IP packet 901 transmitted from a corresponding node includes a destination address (IP=a.b.c.d). Since the destination address (IP=a.b.c.d) is associated with the IP address (IP=v.v.v.v) of the FA, the HA 108 creates a packet 902 by adding a header to the IP packet and forwards the created packet to the control node 705.

The control node 705 removes the header added by the HA 108 from the received packet 902. The control node 705 then creates a packet 903 by adding a header corresponding to a radio system to be used and forwards the created packet to the each gateway 105, 106 or 107 of the each radio system.

The gateways 105, 106 and 107 of the each radio system function as an FA, and thus, the header added by the control node 705 is removed from the received packet 903, a packet 904 is created by adding header information required for each system, and then the created packet is transmitted to a terminal 701.

For example, in case of EVDO, point to point protocol (PPP) is established between the PDSN 105 and the terminal 701. Accordingly, a PPP header, address information on packet control function (PCF) for forwarding the packet to the PCF which is a lower position control station connected to PDSN 105, and address information on the access point for forwarding the packet to the access point 102 which is a lower station of PCF are added. In case of wireless LAN, IPsec is established between the PDIF 106 and the terminal 705. Accordingly, the packet to which those pieces of information are added is forwarded to the terminal. In case of WiMAX, GRE is established between the ASN-GW 107 and the access point 104. Accordingly, GRE key information is added to the received packet.

Plural radio systems can be accommodated at lower levels than the IP level by encapsulating and forwarding the IP packets. Therefore, communication is possible when looked from the levels higher that the IP level without conscious which system is now connected. In addition, resources of the plural radio systems can be integrally managed by providing the monitoring node and the control node together. Consequently, it is possible to reduce the unbalance in the number of users to be connected to each system, balance the network loads, and improve throughputs of individual users. Therefore, the throughput of the whole system can be improved.

<Fifth Embodiment>

Next, a fifth embodiment of this invention is described. In the fifth embodiment, a sequence in which a control node responds to a request for a mobile IP is described using the mobile IP with reference to FIG. 10.

Figure 10:
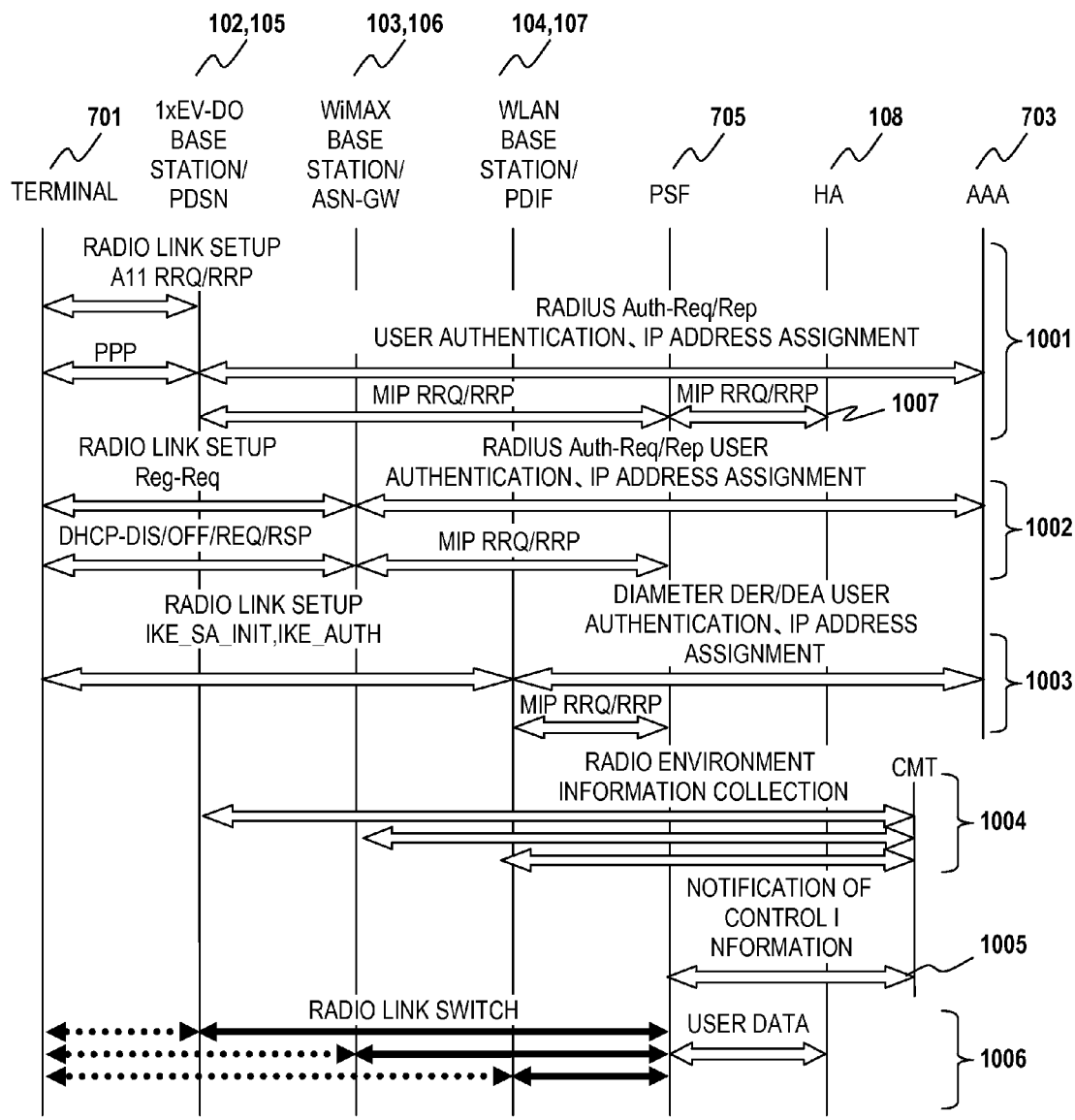
FIG. 10 is a control sequence diagram according to a fifth embodiment of this invention.

In FIG. 10, an EVDO link is first established (1001), a WiMAX link is then established (1002), and a wireless LAN link is established next (1003). Note that, the order of establishing the links may be different from the order shown in the figure.

A terminal transmits a request of the mobile IP to an HA only in the radio system which first established communication. In FIG. 10, the request for the mobile IP is transmitted after authentication is established in EVDO (1007). After the link is established in the first radio system, the request for the mobile IP is terminated by a control node (PSF) 705 and a response is returned to each gateway 105 to 107.

After the link is established, a monitoring node (CMT) collects radio information such as RSSI and/or transmission speed from access points 102 to 104 for the each system (1004) and performs statistic process on the collected radio information. The monitoring node then determines which system is used to forward the packet according to the statistically processed radio information and notifies the control node 705 of control information about which system is used to forward the packet (1005).

The control node 705 switches the radio links for each packet according to the notified radio information (1006).

Industrial Applicability

This invention is operated as a system which enables to use plural radio communication systems such as mobile phones WiMAX and wireless LAN at the same time. The system can be used as a system for improving the time usage efficiency of frequency and balancing system loads on each radio system.

What is claimed is:

1. A communication system which includes plural radio systems, and which connects to a terminal apparatus corresponding to the plural radio systems, comprising:

access points for each radio system;

a monitoring node on a network side of the communication system;

a control node on the network side; and an Authentication Authorization and Accounting (AAA) server which is shared by the plural radio systems;

wherein the AAA server assigns an IP address to the terminal apparatus in a radio system which is initially connected among the plural radio systems according to an IP address assignment request from the terminal apparatus, judges whether an IP address assignment request for a radio system to be subsequently connected is from the same terminal apparatus by using an unique identifier of the terminal apparatus, and assigns the IP address assigned in the initially connected radio system to the terminal apparatus in the radio system to be subsequently connected in a case where the assignment request is determined to be from the same terminal apparatus;

wherein the monitoring node connected to the access points for the each radio system obtains radio information on the each radio system, which includes a number of connected terminals and a load of the each radio systems, wherein a radio system for communicating a packet is determined by only the network side according to the obtained radio information, and wherein, for each packet, the control node switches the radio system for communicating the packet, according to the determination made by the network side.

2. The communication system according to claim 1, wherein the monitoring node:

obtains, at timings predetermined in the each radio system, as the radio information, at least one of RSSI, packet loss, transmission speed of each connected terminal apparatus, number of terminals connected to each access point, and processing loads on the each access point;

converts the obtained radio information from the each radio system into comparable forms among the each radio system; and determines a radio system for communicating the packet according to a comparison result of the converted radio information.

3. The communication system according to claim 1, wherein a home agent:

encapsulates the IP packet received from the network side; and forwards the encapsulated IP packet to the control node, and wherein the control node:

encapsulates the IP packet received from the home agent; and forwards the encapsulated IP packet to gateways of the each radio system.

4. The communication system according to claim 1, wherein the control node: measures traffic of packets in the control node; notifies measured traffic to the monitoring node; and wherein the monitoring node performs a load balancing of the plural radio systems and effects connection restrictions, taking the measured traffic into consideration.

5. A communication system which includes plural different types of radio systems, and which connects to a terminal apparatus adapted to communicate with the plural different types of radio systems, comprising:

access points for each radio system of the plural different types of radio systems, respectively;

a monitoring node on a network side of the access points;

a control node on the network side; and an Authentication Authorization and Accounting (AAA) server which is shared by the plural different types of radio systems;

wherein the AAA server assigns an IP address to the terminal apparatus in a radio system which is initially connected among the plural different types of radio systems according to an IP address assignment request from the terminal apparatus, judges whether an IP address assignment request for a radio system to be subsequently connected is from the same terminal apparatus by using an unique identifier of the terminal apparatus, and assigns the IP address assigned in the initially connected radio system to the terminal apparatus in the radio system to be subsequently connected in a case where the assignment request is determined to be from the same terminal apparatus;

wherein the monitoring node connected to the access points obtains radio information on the each radio system, which includes a number of connected terminals and a load of the each radio systems, wherein a radio system for communicating a packet is determined by only by a determination arrangement provided on the network side of the access points, and according to the obtained radio information, and wherein the control node switches the radio system for communicating the packet according to the determination made by the determination arrangement provided on the network side.

6. The communication system according to claim 5, wherein the control node: measures traffic of packets in the control node; notifies measured traffic to the monitoring node; and wherein the monitoring node performs a load balancing of the plural different types of radio systems and effects connection restrictions, taking the measured traffic into consideration.

* * * * *